WEAR(AND TEAR-) COMPENSATING HIGH-PRESSURE GEAR PUMP

Original Filed Aug. 29, 1968 7 Sheets-Sheet 1

INVENTOR
Otto Eckerle
BY
ATTORNEY

WEAR(AND TEAR-) COMPENSATING HIGH-PRESSURE GEAR PUMP

Original Filed Aug. 29, 1968 7 Sheets-Sheet 2

INVENTOR
Otto Eckerle

BY Otto John Munz
ATTORNEY

WEAR(AND TEAR-) COMPENSATING HIGH-PRESSURE GEAR PUMP

Original Filed Aug. 29, 1968 7 Sheets-Sheet 5

INVENTOR
Otto Eckerle

BY Otto John Munz
ATTORNEY

WEAR(AND TEAR-) COMPENSATING HIGH-PRESSURE GEAR PUMP

Original Filed Aug. 29, 1968 7 Sheets-Sheet 4

INVENTOR
Otto Eckerle

BY Otto John Kenny
ATTORNEY

WEAR(AND TEAR-) COMPENSATING HIGH-PRESSURE GEAR PUMP

Original Filed Aug. 29, 1968 7 Sheets-Sheet 5

INVENTOR
Otto Eckerle

BY Otto John Munz

ATTORNEY

WEAR(AND TEAR-) COMPENSATING HIGH-PRESSURE GEAR PUMP

Original Filed Aug. 29, 1968 7 Sheets-Sheet 6

INVENTOR
Otto Eckerle

BY Otto John Munz

ATTORNEY

WEAR(AND TEAR-) COMPENSATING HIGH-PRESSURE GEAR PUMP

Original Filed Aug. 29, 1968 7 Sheets-Sheet 7

INVENTOR
Otto Eckerle
BY Otto John Munz
ATTORNEY

United States Patent Office

Re. 27,901
Reissued Jan. 29, 1974

27,901

WEAR COMPENSATING HIGH-PRESSURE GEAR PUMP

Otto Eckerle, Am Bergwald 3, 75 Malsch, Germany

Original No. 3,525,580, dated Aug. 25, 1970, Ser. No. 756,160, Aug. 29, 1968. Application for reissue Feb. 2, 1973, Ser. No. 329,181
Claims priority, application Germany, Sept. 1, 1967, P 16 53 826.4
Int. Cl. F01c *1/10;* F03c *3/00;* F04c *1/06*
U.S. Cl. 418—71 15 Claims

Matter enclosed in heavy brackets [ ] appears in the original patent but forms no part of this reissue specification; matter printed in italics indicates the additions made by reissue.

ABSTRACT OF THE DISCLOSURE

Wear [and-tear-] compensating high-pressure gear pump comprising a driven externally-geared pinion, a concomitantly rotating internally-geared [wheel] *ring,* a [movable] *pivotable* sickle-shaped filler member between the pinion and the internal gear *ring* and [either one or] two axial disks covering the gears laterally, as well as an insert member, called "control piston" being disposed on the pressure side of the gears and being radially displaceably arranged with respect thereto, enclosing the outer circumferential surface of the internal gear *ring* in a specific angular range and [touching] *positioning* the latter [as the sole stator part], said control piston containing the first portion of the [pressure] *fluid* outlet duct, *the control piston being* [relieved for the major part with regard to radial forces] *subjected to a radial pressure compensation field* and hence pressing against the circumference of the internal gear *ring* with only a limited amount of excess force so that as a result the internal gear *ring* is essentially supported only on the pinion, on the one hand, and on the filler member, on the other hand [characterized in that] the pump housing [(1) is] *being* eccentrically bored with respect to the pinion shaft [(3)] in such a manner that the center [($M_G$)] of the housing bore [(7)] is positioned on the [hydraulic line of application or effective curve ($W_L$) which extends of necessity also through the internal gear center ($M_H$)] *center line of radial hydraulic thrust on the internal gear ring,* and [in that] the control piston [(10) is] *being* accommodated in the [sickle-shaped] space being formed [due to the eccentricity] between the internal gear [(4)] *ring* and the housing bore [(7), being essentially adapted to the configuration thereof].

BACKGROUND OF THE INVENTION

Field of the invention

The present invention relates to a wear [and tear-] compensating high-pressure gear pump comprising a driven externally-geared pinion, a concomitantly rotating internally-geared [wheel] *ring* and a [movable] *pivotable* sickle-shaped filler member between the pinion and the internal gear *ring,* as well as an insert member, called "control piston" which is disposed on the pressure side of the gears and radially displaceably arranged with respect thereto, and which encloses [or surrounds] the outer circumferential [area] *surface* of the internal gear *ring* in a specific angular range, [touching] *positioning* the latter [as the sole stator part. This insert member contains the first portion of the pressure outlet duct, is relieved for the major part with regard to radial forces and hence presses against the circumference of the internal gear with a limited excess force so that the internal gear is supported essentially only on the pinion, on the one hand, and on the filler member, on the other].

Description of the prior art

In the known pumps of this type, the control piston is positioned in [one] *a* recess [each of] *formed by* the pump housing and [of] a cover being specifically provided for the control piston. By virtue of this arrangement, the angle [at] *with* which the control piston encloses the outer circumferential surface of the internal gear *ring* is only small. Furthermore, the control piston has a complicated [construction] *structure* since it must not only be radially movable with respect to the internal gear *ring,* but also has to compensate for [inclined or slanted positions] *repositioning* of the internal gear *ring* which [are] *is* due to wear [and tear] *on the gears and filler member.*

SUMMARY OF THE INVENTION

In order to eliminate the disadvantages and drawbacks of the known pumps as outlined above, the present invention proposes that the pump housing be eccentrically bored with respect to the pinion shaft in such a manner that the center of the housing bore is positioned on the [hydraulic line of application, or effective curve, which extends of necessity also through the internal gear center] *center line of radial hydraulic thrust on the internal gear ring,* and so that the control piston is accommodated within the [sickle-shaped] *eccentric annular* space formed due to the eccentricity between the internal gear *ring* and the housing bore and is adapted to the configuration of that space.

Since the control piston is thus positioned within the housing bore, the *previously required* recesses in the housing and in the cover, which serve for guiding it, as well as the [otherwise] *additionally* required [seals or] gaskets are rendered unnecessary. The control piston can enclose the internal gear *ring* within an angular range of up to 180° and above, which results in a [stabler] *more stable* positioning [, that is less sensitive to] *and less* vibrations [,] of the internal gear *ring* on the control piston. In addition thereto, the control piston may be manufactured in a simple manner inasmuch as its surface is composed of plane and circular surfaces.

DESCRIPTION OF THE PREFERRED EMBODIMENTS

Figure 1:
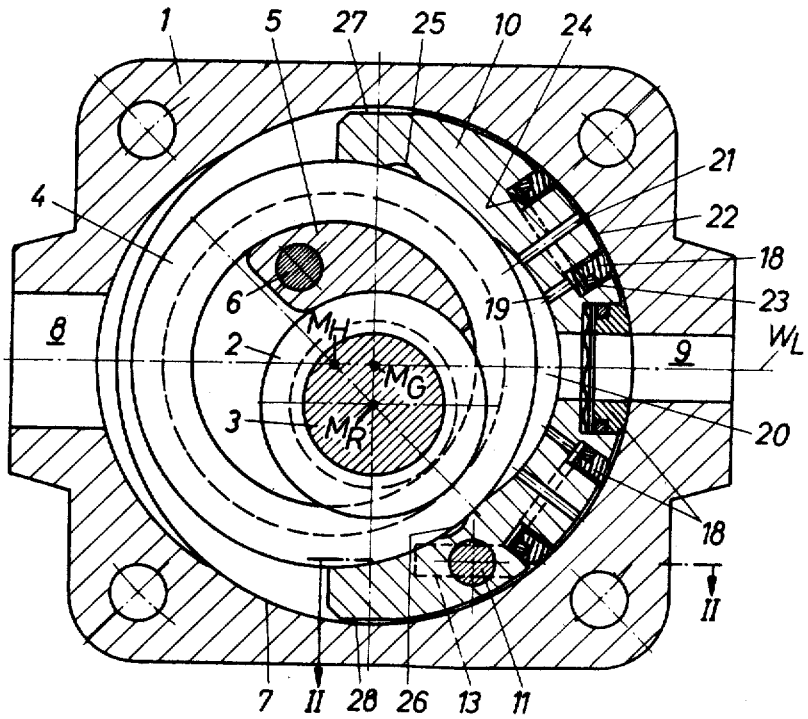
FIG. 1 is a cross-sectional view of an embodiment of the invention.

Various embodiments of the present invention are illustrated in the accompanying drawings wherein like elements are identified with the same reference numerals.

Figure 2:
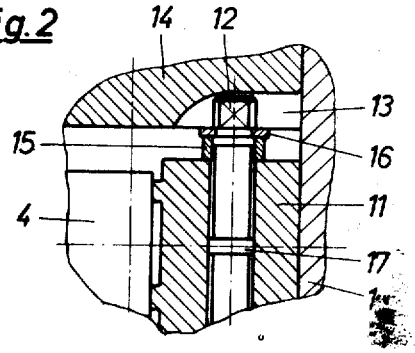
FIG. 2 is a cross-sectional view taken along lines II—II of FIG. 1.

The pump which is shown in FIG. 1 is a cross-sectional view and in FIG. 2 in a view taken along line II—II of FIG. 1 consists of the housing 1, the pinion 2 with the driven pinion shaft 3, the concomitantly rotating [internally-geared wheel] *internal gear ring* 4 and the sickle-shaped filler member 5 which is [movably] *pivotably* positioned on the bolt 6. The housing bore 7 is eccentrically [hollowed out] *bored* with regard to the center $M_R$ of the pinion shaft 3 in such a manner that the [hydraulic line of application for effective curve] *center line of radial hydraulic thrust* $W_L$ which extends axially through the suction connection 8 and the passsure connection 9 also extends through the center $M_G$ of the housing bore 7 and the center $M_H$ of the internal gear *ring* 4.

Mounted on the pressure side of the pump between the internal gear *ring* 4 and the housing bore 7 is a control piston 10 which is secured [in its position] against rotation by means of a pin 11. As illustrated in FIG. 2, the pin 11 [engages] *has* on both sides [with one] *a* square head 12 [each in] *which engages* a flat-milled-out portion 13 of the housing parts 14. Accordingly, the control piston 10 is [supported on] *laterally positioned against* the housing part 14 respectively by way of a spacer tube 15 and a retainer ring 16. The pin 11 has in its center a small collar [or flange] 17 which, due to the short guide thereof in the bore of the control piston 10, allows for a limited [alignment] *vertical adjustment* of the control piston 10 [toward] *relative to* the gear elements 2 and 4.

In order to achieve a compensation of the radial [forces] *hydraulic thrust* three pressure pistons [or rams], for example ring pistons 18 made from plastic material, are provided within the control piston 10 and their end faces are rounded off or chamfered in such a manner that they have only a limited area of contact with the housing bore 7. The space below each ring piston is in operative connection with the pressure space of the pump by way of a bore 19 which terminates in a recess 20 of the control piston 10. A further bore 21 extends from the recess 20 to the space 22 [between] *which is defined by* the control piston 20 and the housing bore 7 [which is delimited by] *and the bore of* ring piston 18. The ring pistons are further provided with sealing rings 23 and are subjected to the action of [cup or] undulated springs 24. By virtue of this construction, the ring pistons 18 are pressed against the housing bore 7—by means of the undulated springs when the pump begins to run, and by means of the pressure medium during the operation of the pump—with only a small amount of force, and only low frictional forces will be produced when the control piston 10 [becomes displaced] *gradually shifts* due to wear [and tear of] *on* the internal gear *ring* 4. Pressure fields are formed or built up in the spaces 22 between the ring pistons 18 and the housing bore 7 which press the control piston 10 against the internal gear *ring* 4 and the latter against the filler member 5 and the pinion 2, so that the pinion 2 will [comb or] mate with the internal gear *ring* 4 without backlash [of the toothed wheels]. The [relieving] *compensation* pressure field which is being built up within the recess 20 and which is delimited by means of transverse grooves 25 and 26 in the control piston 10 [, that are under the effect of suction pressure] *which communicate with the suction side of the pump,* counteracts the pressure fields mentioned above. The control piston 10 encloses the internal gear *ring* 4 within an angular range of slightly more than 180°. In order not to impair the possibility of a radial displacement of the control piston 10, the latter is provided at the ends of the outer circumference when milled [-out] surfaces 27 and [/or] 28. In order to assure that the [conveying] *pressure* medium can flow from the suction side of the pressure side, the internal gear *ring* 4 has radial bores (not shown) extending between each tooth gap and the circumferential surface of the internal gear *ring* 4.

Figure 3:
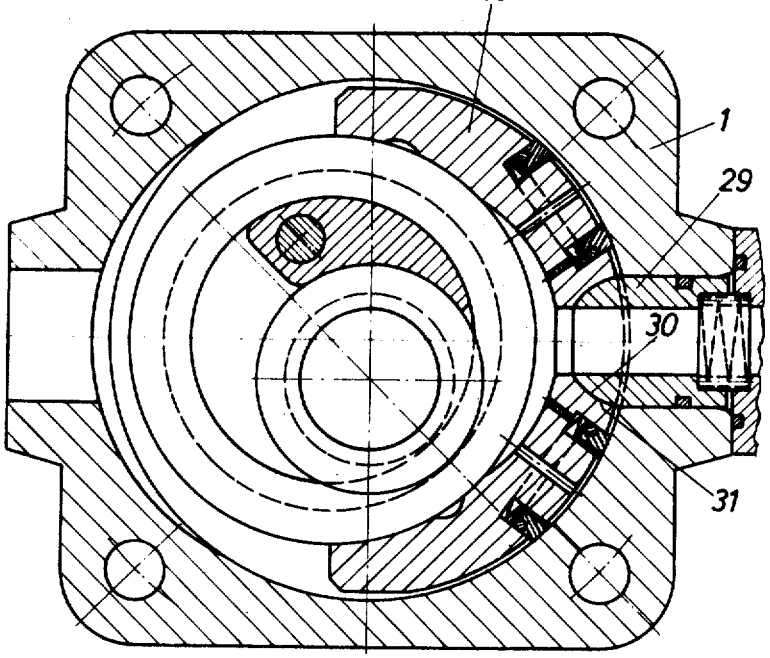
FIG. 3 is a cross-sectional view of another embodiment of the [suspension means] *mounting* of the control piston 10 of FIG. 1.

FIG. 3 illustrates another embodiment relative to the [suspension] *mounting* of the control piston 10. The central pressure piston 29 is guided within a bore of the housing 1 and has at its inner end a spherical surface 30 which engages in spherical indentation 31 of the control piston 10, thus securing the latter against rotation. This measure affords the advantage that the control piston 10 can [become adjusted or aligned with regard to the gearing] *align itself with the gears* almost free from any forces, while nevertheless being secured against rotation.

Figure 4:
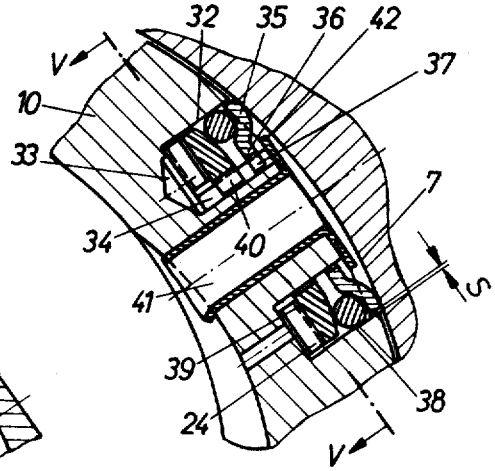
FIG. 4 shows a detail of the radial pressure field 22 of FIG. 1.
Figure 5:
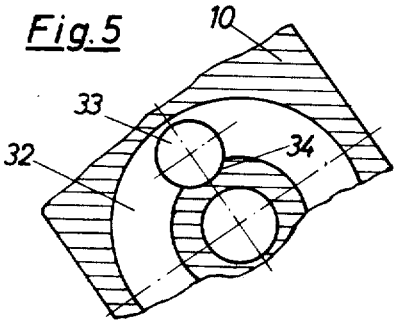
FIG. 5 is a cross-sectional view taken along V—V of FIG. 4.

A particular embodiment of the circular radial pressure field (22 in FIG. 1) is illustrated in FIG. 4 as well as in FIG. 5, the latter being a cross-sectional view taken along line V—V of FIG. 4. A [pocket] *blind* bore 33 is so disposed in the [annullar] *annular* [bore or] recess 32 of the control piston 10 that a groove 34 is produced. A sheet metal ring 36 having a beaded edge 35 is guided within the [bore or] recess 32 with a small gap S [whose] , *whereby the* beaded edge [abuts or] *35* rests against the housing bore 7. The sheet metal ring 36 which engages with a nose or projection 37 in the groove 34, thus being secured against rotation, has the advantage that it cannot become canted by reason of its small thickness. The gap S is sealed by means of an O-[shaped] ring 38 which is pressed against the sheet metal ring 36 by [a cup and, respectively,] an undulated spring 24 by way of a plastic ring 39. The plastic ring 39 is likewise fixed in position within the groove 34 by way of a nose or projection 40. As an aid during assembly serves a tubular rivet 41 whose flange 42 prevents the sheet metal ring 36 from falling out.

Figure 7:
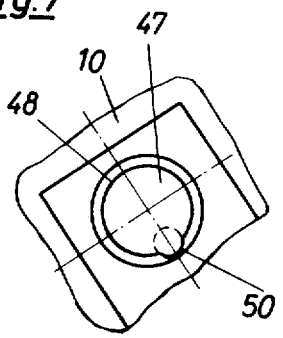
FIG. 7 is a view along the arrow 7 of FIG. 6.
Figure 6:
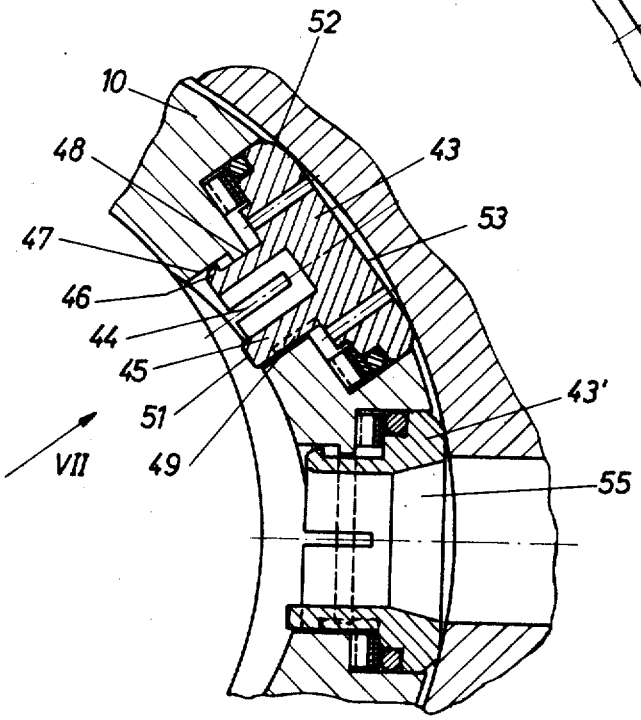
FIG. 6 is a cross-sectional view, with portions cut off, of another embodiment of the control piston 10 of FIG. 1.

Another embodiment of the control piston 10 is illustrated in a cross section in FIG. 6, and in FIG. 7 viewed in the direction of the arrow VII. The pressure piston 43 which is made according to the injection molding process for plastics comprises a stud 45 having slots 44 and a collar portion 46 at the lower end thereof. [During] *Following* the introduction of the stud 45 into the bore 47 of the control piston 10, the collar 46 locks behind a projection 48 in the bore 47. The pressure piston 43 is secured in position by means of a cam 49 being provided at the stud 45 and engaging in a groove 50 of the control piston 10. A nose 51 serves as an aid for the introduction of the stud 45. The outer edge of the pressure piston 43 is provided with a rounded off portion 52 so as to prevent canting. The [surface] *space* 53 of the pressure piston 43 is supplied with pressure medium by way of the bores 54, thus being hydrostatically [relieved] *balanced*. This [relief] *balance* is necessary for the following reason: [During] *Due to* the deflection of the pinion shaft 3 and as a result of [abrasion] *wear*, the control piston 10 executes a slight rotary movement about its point of suspension near the tooth engagement. During this rotary movement, the pressure field at the outside diameter of the control piston 10 must execute a slight displacement movement at the inside diameter of the housing. In order not to obstruct this displacement movement, a hydrostatic [relief] *compensation* of the pressure fields toward the inside [diameter] of the housing is necessary. The central pressure piston 43' is constructed in an analogous manner, but it has an axial opening 55 which serves for the discharge of the *pressure* medium [that has been conveyed].

Figure 8:
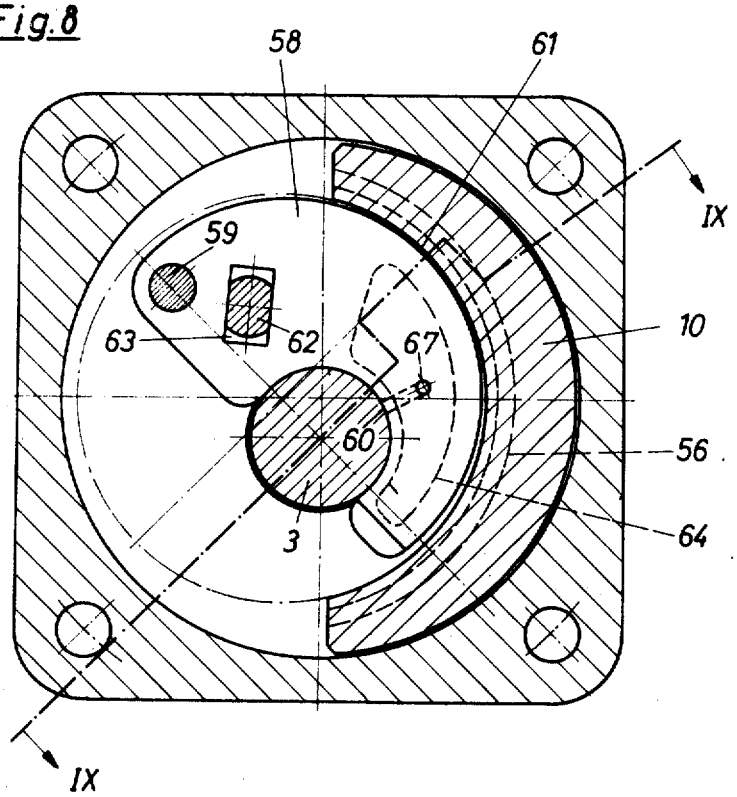
FIG. 8 is a cross-sectional view of the pump of the invention [dealing primarily with means to eliminate the differences in pressure and excessive wear and tear upon the filler member of the control piston 10 and the internal pressure and is] shown in cross section VIII—VIII of FIG. 9.
Figure 9:
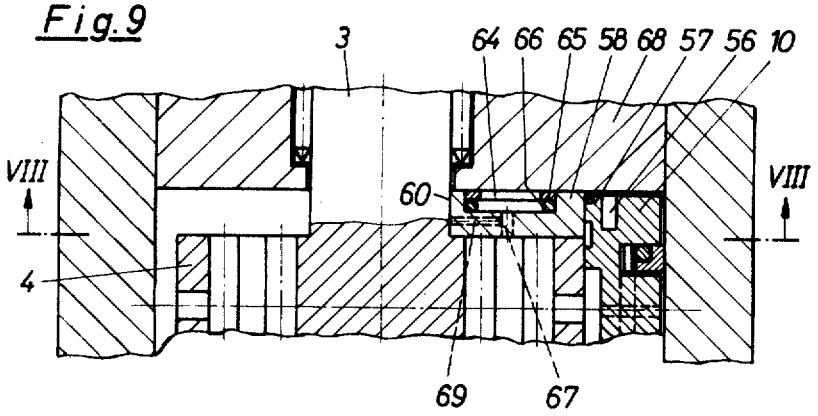
FIG. 9 is a cross-sectional view with portions eliminated, taken on line IX—IX of FIG. 8.

The pump shown in FIG. 8 in a cross section taken along the line IX—IX of FIG. 9, and in FIG. 9 in a cross section taken along line VIII—VIII comprises means for partially [relieving] *balancing* the filler member. It has been found that the filler member is subjected to a greater degree of wear [and tear] since the pressure [of] *exerted by* the control piston 10 [which is exerted] on the filler member by way of the internal gear *ring* 4 is greater than the internal pressure. This disadvantage is obviated by the measures which will be described hereinafter.

The control piston 10 is *axially* wider than the internal gear *ring* 4 and is supported on the axial disk 58 by means of a collar 57 [formed] *bordered* by a [perforation or aperture] *lateral recess* 56. The axial disk 58 is disposed [rotatably] *pivotably* about the pin 59 and comes to [abut or] bear against the pinion shaft 3 with a cylindrical bore or recess 60. The control piston 10, on the other hand, is supported only against the surface [element] *portion* 61 of the axial disk 58. [Within the area] *In the angular region* of the tooth engagement, the control piston 10 is not supported on the axial disk 58 so that [at that point] it will push the internal gear *ring* 4 [into the flanks of] *against* the [piston] *pinion* 2. It is possible to [keep] *make* the filler member slightly larger in its outside diameter so that the control piston 10 will initially not come to abut against *the surface portion* 61, but will do so only after the filler member has been [introduced] *worn in*. Due to the spring action of the collar 57, existing *manufacturing* tolerances may be [bridged] *compensated for*. The bolt 62 serving for the [suspension] *pivotable positioning* of the filler member is [chamfered] *flattened* at the ends on both sides and guided displaceably within a slot 63 of the axial disk 58.

The axial disk 58 comprises a recess 64 [, building up a] *for the creation of an axial compensation* pressure field, and a piston 56 which is sealed with the aid of [a loop] *an O*-ring 66 is guided in the recess 64. The supply of the pressure field *with pressure medium* is effected by way of the bore 67. The piston 65 is [provided] annular so that only a limited friction arises between the piston and the axial housing part 68. During the deflection of the pinion shaft 3, the axial disk 58, by virtue of its [almost] floating [position] *arrangement*, can be additionally [slid onto] *pressed against* the pinion shaft 3 by the control piston 10. The contact surface of the axial disk 58 with the pinion shaft 3 may be lubricated with pressure oil through the bore 69.

In the above-described construction of the pump, the surface pressure between the internal gear *ring* and the filler member is reduced since the control piston 10 is supported not only upon the internal gear *ring* but, by way of axial disks, also upon the pin [thereof] *62* and the pinion shaft 3 so that the contact pressure is distributed to a greater area and the total wear [and tear] is reduced. Also taken into account is the problem that, in a newly installed pump, the internal gear *ring* does [not simultaneously] abut against the filler member [with] *before* the control piston *is supported* at the axial disks. If the filler member, when new, is provided with a larger outside diameter, the control piston 10 does not press upon the axial disk while the sealing of the pressure space is nevertheless assured. When the pump is placed in operation, an increased [abrasion] *wear* at the filler member (running-in [abrasion] *wear*) will therefore take place until the control piston with the collar thereof will [abut against or] bear on the axial disk.

Figure 10:
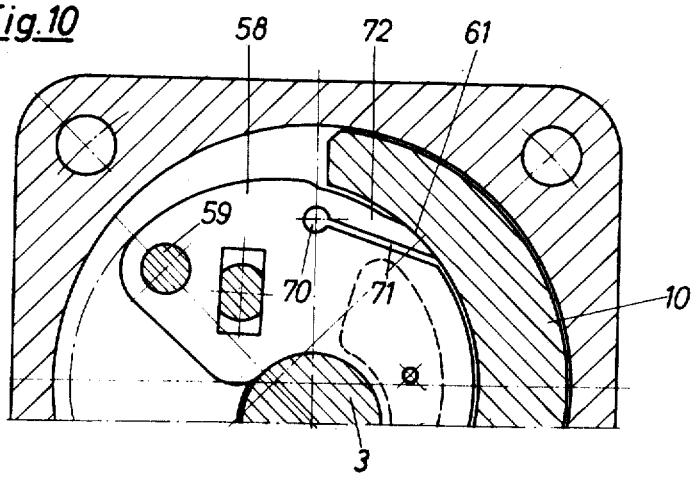
FIG. 10 is a cross-sectional view of a portion of the pump of the invention showing an additional improvement [s] of the support of the control piston.

FIG. 10 shows a further possibility for supporting the control piston 10 by way of the axial disk 58 on the pinion shaft 3 and the pin 59. The surface [element] *portion* 61 of the axial disk 58 is [elastically provided] *made yielding radially* by means of a bore 70 and a slot 71 so that, due to the resilience of the [element] *disk portion* 72, a compensation of the difference is in the abutment of the internal gear *ring* against the filler member [, or its contact therewith,] and *the simultaneous support* of the control piston 10 [at and, respectively, with] *by* the axial disk 58 can take place.

A still further possibility of [suspending] *supporting* the control piston 10 is illustrated in FIGS. 11 to 14. The axial disk 73 is positioned on the pinion shaft 3 and provided with a bore into which engages a pin 74 which, in turn, is positioned in the control piston 10. When a force is exerted toward the center of the housing by the pressure fields 75, the control piston 10 will press the internal gear *ring* 4 [in a] *into* tooth engagement [upon the flanks of] *with* the pinion 2 while simultaneously [turning or rotating] *pivoting* the axial disk 73 about the center 76 of the pinion shaft 3, until the internal gear *ring* 4 comes to [rest against or] bear against the filler member 5. This solution avoids the disadvantage which arose as a result of the heretofore known measures, and specifically that, during the [abrasion] *wear* of the filler member 5 and due to the change of the position of the internal gear *ring* center 77, a displacement of the [gearing] *mid-point of tooth engagement took* place while, however, the control edges in the axial disk and in the control piston as well as the position of the pressure field [were maintained] *remained in their initial place*.

Figure 14:
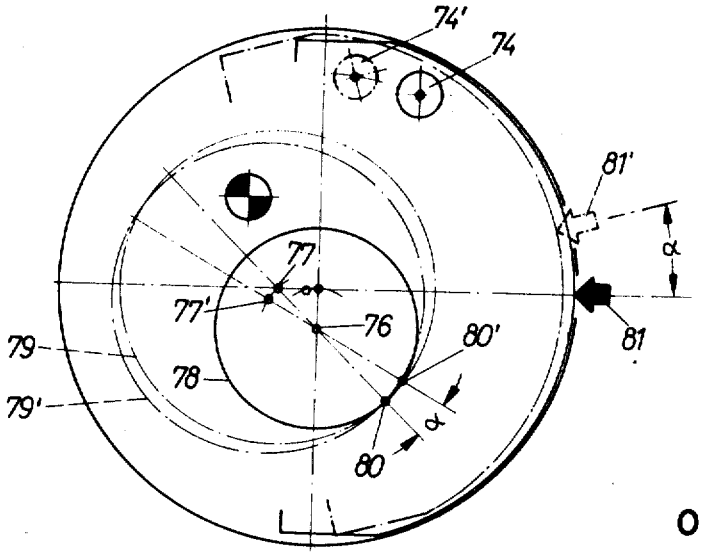
FIG. 14 is a schematic diagram showing another means of [suspension] *mounting* of the control piston 10.
Figure 15:
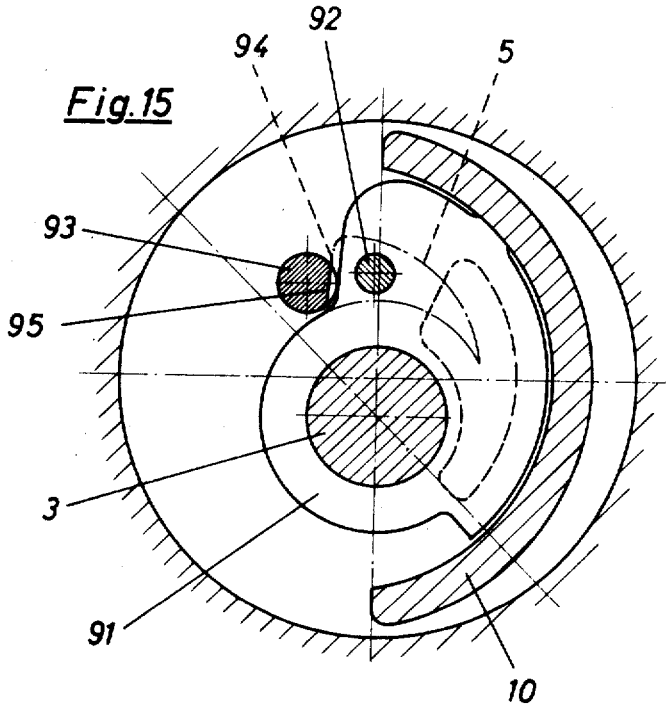
FIG. 15 is a modification of the embodiment of FIG. 11.

The [schematic showing] *diagram* of FIG. 14 indicates these interrelations. When the filler member is worn, the internal gear *ring* 4 with its pitch circle [or circle of contact] *shown at* 79 [and/] or 79' rolls along [on] the pitch circle 78 of the pinion. The center 77 of the internal gear *ring* 2 executes at that time a [rotary] *pivoting* movement about the center 76 of the pinion shaft and [travels] *shifts* toward point 77'. The [pitch point, or instantaneous center of motion,] *mid-point of tooth engagement* 80 is shifted to 80'. [By means of] *Because* the axial disk 73 [being rotatably suspended in] *is pivotable around* point 76, the pin 74 [and/or] *is shifted to* 74' [is moved, pulling behind], *thereby also shifting* the control piston, so that also the [resultant] *thrust center* 81 of the pressure fields is [pulled behind] *shifted* about the angle $\alpha$ to 81'; in other words, the wear [and tear] of the filler member and the automatic [re-setting] *shifting* of the internal gear *ring* have changed nothing with regard to the existing control and force conditions.

Figure 11:
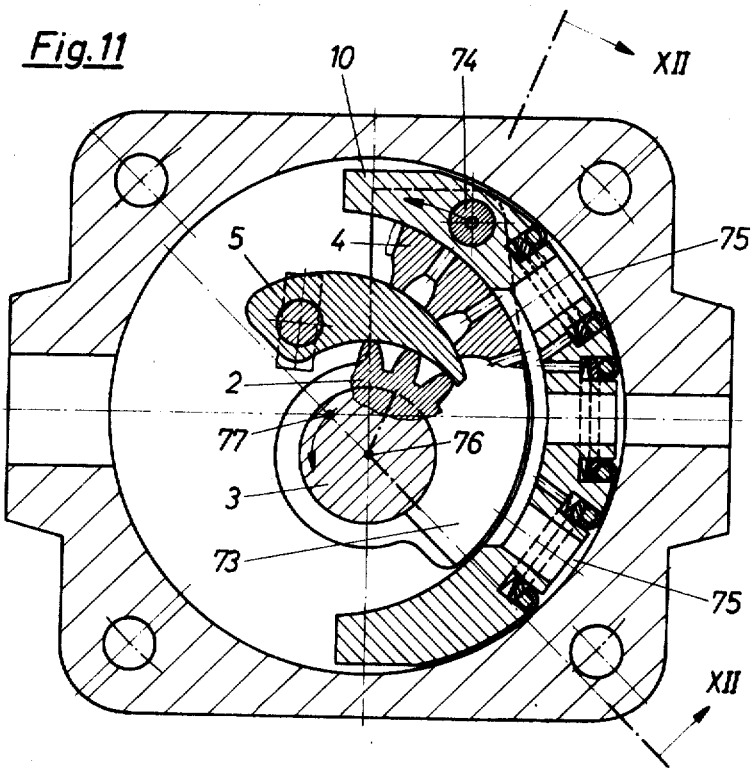
FIG. 11 is a cross-sectional view of the pump of the invention showing still additional means of [suspending] *mounting* the control piston 10.
Figure 12:
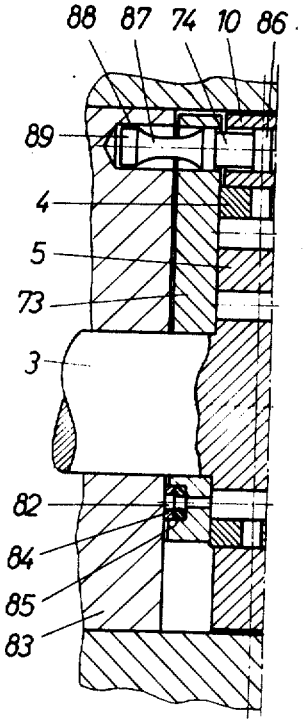
FIG. 12 is a cross-sectional view taken along line XII—XII of FIG. 11.

FIG. 12 is a cross-sectional view taken along line XII—XII of FIG. 11. The axial disk 73 is axially [relieved] *balanced hydraulically* with regard to the cover 83 by means of a pressure field 82 so that the [re-setting] *shifting* of the axial disk 73, the internal gear *ring* 4 and the control piston 10 will not be [met with or] opposed by a high frictional resistance. The pressure piston 84 consists of an endless *rectangular* wire [having a rectangular cross-section which is formed according to] *whose outline corresponds to the outline of* the recess 64 in FIG. 8 and *which is* sealed off by means of an O-[shaped] ring 85. The control piston 10 is secured in position with respect to the axial disk 73 by way of the pin 74 [which,] in the center of the control piston [, can be readily adjusted to the gearing]. The pin 74 projects with its extension 87 into a bore 88 of the cover 83. The collar 89 has play in the bore 88 so that the control piston 10 can execute together with the axial disk 73 a [rotary] *pivoting* movement about the pinion shaft 3 (see FIG. 14) until the collar 89 rests against [or makes contact with] the bore 88. The play of the collar 89 in the bore 88 is so designed that, [following] *with* the abutment [or bearing] of the collar 89 in the bore 88, the filler member [has run] *is worn* in and corresponds in its contour precisely to the crown [lines or] circles of the gears. In case of a pressure increase, both the pinion shaft 3 and also the filler member bolt 6 will deflect. In order to also compensate for the gap being formed during this deflection, the bolt is provided elastic. This may be accomplished, for example, in that the pin is weakened in its moment of resistance in the area of the extension 87 by a reduction of the cross-sectional area.

Figure 13:
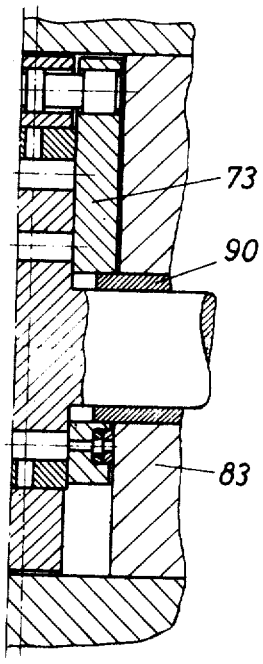
FIG. 13 is a cross-sectional view also taken along line XII—XII of FIG. 11, showing a different manner of positioning the axial disk 73.

FIG. 13 is equally a cross-sectional view taken along line XII—XII of FIG. 11. The difference as compared to FIG. 12 consists in the manner of positioning the axial disk 73: In this embodiment, the positioning is effected on a bearing bushing 90. The positioning of the axial disk 73 could, of course, also be made on a corresponding cylindrical shoulder portion of the cover 83.

FI1. 15 illustrates a modified embodiment of the pump shown in FIG. 11, wherein the control piston 10 has been indicated only schematically. This embodiment is based upon the following [deliberation] *considerations*: As a result of the different operating conditions to which these pumps are subjected, for example, pressure, rate of revolutions, temperature, viscosity, the hydraulic load on the filler [memmber] *member* 5 varies, i.e. in the embodiments in which the control piston 10 is supported by way of the axial disks it is possible that the filler member is pressed [to an increased extent] *too hard* against the [crown circle diameter] *tooth crowns*. This fact causes [a] wear [and tear] which can no longer be compensated by the compensating pressure fields of the control piston because of the support of the control piston on the pinion shaft 3 via the axial disks. In order to obviate this disadvantage, it is necessary that the filler member and the axial disk be so [suspended] *supported* that minor moments acting upon the filler member, the housing, the control piston and the pinion shaft are transferred without loading [or charging] the gliding surfaces of the filler member.

For this purpose, the axial disks 91 are [rotatably] *pivotably* positioned on the pinion shaft 3 and connected with the filler member 5 by means of a cylindrical pin 92, and the [aggregate] *assembly* which is thus formed is supported against a housing pin 93 being secured to the housing. The filler member 5 is provided at the thicker end thereof with a surface 94 and bears therewith against a surface 95 of the housing pin 93 which is [rotatably and/] *pivotably* or displaceably positioned in bores of the axial housing parts so as to be adapted to execute the [gliding] *shifting* movements that are required due to the deflection of the pinion shaft.

It should be understood of course that the foregoing disclosure relates to only preferred embodiments of the invention and that it is intended to cover all changes and modifications of the examples of the invention herein chosen for the purposes of the disclosure which do not constitute departures from the spirit and scope of the invention set forth in the appended claims.

What is claimed is:

1. Wear [and tear-] compensating high-pressure gear pump comprising:

*a pump housing with a housing bore, a pressure inlet duct, a pressure outlet duct, and at least one removable end cover,* a driven externally-geared pinion *and pinion shaft which is journalled in said housing,* a concomitantly rotating internally-geared [wheel] *ring,* a [movable] *pivotable* sickle-shaped filler member between the pinion and the internal gear *ring* and at least one axial disk covering the gears laterally,

[as well as an insert member, called "control piston",] *a control piston* being disposed *inside the housing bore* on the pressure side of the gears and being radially displaceably arranged with respect thereto, enclosing the outer circumferential surface of the internal gear *ring* in a specific angular range [and touching the latter as the sole stator part] *so as to position the latter,* said control piston containing the first portion of the pressure outlet duct [, being relieved for the major part with regard to radial forces and hence] *and including means for hydraulically compensating the radially outward-directed hydraulic thrust on the internal gear ring and on the control piston, said compensating means being so arranged that the control piston is* pressing against the circumference of the internal gear *ring* with [only] a limited [amount of excess] force so that [as a result] the internal gear *ring is maintained in engagement with the pinion and thus* is [essentially] supported [only on] *by* the pinion *teeth,* [on the one hand, and on] the filler member, [on the other hand] *and the control piston, the gear pump being further* characterized in that

[the] *said* pump housing [1] is eccentrically bored with respect to the pinion shaft [3] in such a manner that the center [$M_G$] of the housing bore [7] is positioned on the [hydraulic line of application or effective curve $W_L$ which extends of necessity also through the internal gear center $M_H$] *center line of radial hydraulic thrust on the internal gear ring,* and in that

[the] *said* control piston [10] is accommodated in the [sickle-shaped] *eccentric annular* space [being formed due to the eccentricity] between the internal gear ring [4] and the housing bore [7], being essentially adapted to the configuration thereof.

2. High-pressure gear pump according to claim 1, characterized in that the control piston [10] encloses the internal gear *ring* [4] within an annular range of approximately 180°.

3. High-pressure gear pump according to claim 1, characterized in that *the outer contour of the control piston forms a small gap with the adjacent wall of the housing bore, and*

*said compensating means includes* hydrostatically relieved circular *compensation* pressure fields [22] *which* are provided in the *gap between the* outer circumferential surface of the control piston [10] *and the housing bore,* said pressure fields being formed by *annular* pistons positioned in the control piston and being in [operative connection] *communication* with the pressure [space] *side* of the pump via bores [21].

4. High-pressure gear pump according to claim 3, characterized in that the edges of the *annular* pistons are chamfered, [in that the rear of] the *annular* pistons [is charged] *being preloaded against the housing* by means of [a charging spring and are in operative connection] *preloading springs, the rear sides of the annular pistons communicating* with the pressure [space] *side* of the pump via a bore [19] *in order to balance said annular pistons.*

5. High pressure gear pump according to claim [1] *3*, characterized in that [the central] *said compensating means includes a compensation* pressure *field which is arranged substantially in the mid-axis of the control piston and* [, respectively,] is *formed by a tubular support* [ring] piston [29] *which* is guided within the housing [1] *for radial motion* and is provided at [the] *its* inner end [thereof] with a spherical *support* surface [30 engaging in a spherical indentation 31 of], the control piston [10] *being provided with a matching spherical recess by which it is pivotably positioned on the tubular support piston.*

6. High-pressure gear pump according to claim [1] *3*, characterized in that [the ring piston 18 are replaced by sheet metal rings 36 having a beaded edge 35 and being supported via an O-shaped ring 38 and a plastic ring 39 each on a charging spring, said sheet metal ring 36 and said plastic ring 39 engaging each with one nose in a groove 34 of the annular recess or bore 32, said sheet metal ring having a gap S with respect to the recess or bore] *said pressure compensation*

*fields are formed by composite annular pistons which include:*

*a sheet metal ring with a contact bead at its periphery, a plastic supporting ring under the sheet metal ring, an O-ring between the sheet metal ring and the supporting ring, and a preloading spring under the supporting ring, the sheet metal ring and the supporting ring having each a radial nose,*

*the control piston including matching, radially oriented annular recesses for the accommodation of the composite annular piston with radial gaps for the sheet metal rings and a groove for the earlier-mentioned radial noses.*

7. High-pressure gear pump according to claim 6, characterized [by] *in that the control piston further includes a radial through-bore in the axis of each composite annular piston, the latter further including* a tubular rivet [41 whose flange 42 retains the sheet metal ring 36 during the assembly thereof] *in said radial through-bore which serves as a communication channel between the pressure field and the pressure side of the pump, the tubular rivet including a flange for retaining the composite annular piston in the control piston during assembly of the pump.*

8. High-pressure gear pump according to claim [1] *3,* characterized in that [the pressure pistons 43 consist of plastic material and comprise a stud 45 being equipped with slots 44 and a collar 46, and in that the bore 47 of the control piston 10 receiving the stud 45 is provided with a projection 48 locking behind the collar 46, as well as with a groove 50 in which engages a cam 49 disposed at the stud 45] *said pressure compensation fields are formed by pressure pistons of resilient plastic material each of which includes:*

*a piston head with an outer end face engaging the housing bore, a slotted stud portion extending inwardly from the piston head, a radially protruding cam on the stud portion, a collar at the inner end of the stud portion, and a preloading spring under the piston head,*

*the control piston including a matching radially oriented recess for each piston head, a matching bore for each stud portion, a radial projection in each of said bores capable of locking behind said collars and a groove for each cam to prevent the rotation of the piston.*

9. High-pressure gear pump according to claim 1, characterized in that *it includes two axial disks arranged laterally between the gears and the housing,* the control piston [10] *including on each side a lateral collar which bears on the axial disk so that the control piston* is *radially* supported not only on the internal gear *ring* [4] but also [via a collar 57 on] *by* the lateral axial disks [58] which rest with a bore on the pinion shaft [3].

10. High-pressure gear pump according to claim 9, characterized in that the filler member *includes a* [bolt 62] *pivot pin which* [is displaceably positioned in] *extends through* the axial disks [58], *the pivot pin being displaceable relative to the axial disks in an oblique radial direction only,* and [in that] said axial disks [58 are suspended on a pin 59] *include a pivot pin at a distance from the pinion center to secure them against rotation around said center.*

11. High-pressure gear pump according to claim 9, characterized in that [the collar 57 is] *said lateral collars are* rendered elastic by means of [a perforation or aperture 56] *axial recesses* in the control piston.

12. High-pressure gear pump according to claim 9, characterized in that the part [72] of the axial disks [58] against which the control piston [10] bears [or abuts] is provided elastic by means of a slot [71] which changes over into a bore [70].

13. High pressure gear pump according to claim 9, characterized in that the filler member [5], when new, has a slightly greater [outside diameter] *radial thickness* than *the thickness that would be* necessary *for simultaneous support of the control piston by the internal gear ring and by the axial disks* so that the internal gear *ring* [4 being pressed on by the control piston 10 initially runs up on] *and* the *oversize* filler member *are subjected to higher loads during the running-in of the pump, thereby wearing-in the filler member* [before] *until* the axial [disk 59 is] *disks are* supported on the pinion shaft [3] *and the control piston bears on the axial disks.*

14. High-pressure gear pump according to claim [1] *9,* characterized in that the axial disks [73] are positioned on the pinion shaft [3 and comprise a bore into which a pin 74 engages, said pin being positioned in the control piston 10] *and radially overlap with the control piston,*

*the control piston including an axial pin which extends through the axial disks and the control piston.*

15. High-pressure gear pump according to claim [1] *14,* characterized in that the *axial* pin [74 engages with an extension 87 into a bore of the housing cover 83 and is equipped in the bores of the control piston 10 and of the housing cover 83 with a collar 86, 89, and in that it has within the area of the extension 87 a reduction of the cross sectional area] *extends also into the cover of the pump housing, the latter including a matching bore,*

*the axial pin including a narrow support collar in each of the areas of engagement with the housing cover, the lateral disks, and the control piston; the pin further including a weakened portion between the collars in the housing cover and in the adjacent axial disks, thereby blocking the control piston against rotation inside the housing, while providing a small amount of yield on the control piston.*

[16. High-pressure gear pump according to claim 1, characterized in that the axial disks 91 are rotatably positioned on the pinion shaft 3 and are connected by means of a cylindrical pin 92 with the filler member 5, the aggregate 5, 91, 92 thus formed being supported against a housing pin 93 being secured in the housing.]

[17. High-pressure gear pump according to claim 16, characterized in that the filler member 5 is flattened at its thicker end 94 and rests or bears against the equally flattened but otherwise cylindrical housing pin 93, the latter being movably positioned in bores of the axial housing parts.]

References Cited

The following references, cited by the Examiner, are of record in the patented file of this patent or the original patent.

UNITED STATES PATENTS

| | | | |
|---|---|---|---|
| 1,719,639 | 7/1929 | Wilsey | 418—169 |
| 3,273,502 | 9/1966 | Martz | 418—6 |
| 3,289,599 | 12/1966 | Eckerle et al. | 418—126 |
| 3,315,608 | 4/1967 | Eckerle | 418—72 |
| 3,315,609 | 4/1967 | Eckerle | 418—169 |

CARLTON R. CROYLE, Primary Examiner

J. J. VRABLIK, Assistant Examiner

U.S. Cl. X.R.

418—126, 169, 170